(12) United States Patent
Zhang (10) Patent No.: US 11,252,309 B1
(45) Date of Patent: Feb. 15, 2022

(54) MONITORING DEVICE

(71) Applicant: SHANGHAI IMILAB TECHNOLOGY CO., LTD., Shanghai (CN)

(72) Inventor: Jian Zhang, Shanghai (CN)

(73) Assignee: SHANGHAI IMILAB TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/371,075

(22) Filed: Jul. 8, 2021

(51) Int. Cl.
    *H04N 5/225* (2006.01)
    *H04N 7/18* (2006.01)

(52) U.S. Cl.
    CPC ..... *H04N 5/225251* (2018.08); *H04N 5/2252* (2013.01); *H04N 5/2254* (2013.01); *H04N 7/183* (2013.01)

(58) Field of Classification Search
    CPC .................................................. H04N 5/225251
    USPC ........................................................... 348/340
    See application file for complete search history.

(56) References Cited

U.S. PATENT DOCUMENTS 6,268,882 B1 * 7/2001 Elberbaum ...... G08B 13/19619
348/143

* cited by examiner

*Primary Examiner* — Joel W Fosselman
(74) *Attorney, Agent, or Firm* — Fideli Law PLLC (57) ABSTRACT

A monitoring device is disclosed, including: a base; a first rotary mechanism which is connected to the base and rotatable relative to the base; a supporting bracket fixed to the first rotary mechanism; a second rotary mechanism which is connected to the supporting bracket and rotatable relative to the supporting bracket; a lens assembly fixed to the second rotary mechanism; and a housing fixed to the supporting bracket and having an opening to expose the lens assembly; the first rotary mechanism, the supporting bracket, and the second rotary mechanism are located in the housing, a rotation axis of the first rotary mechanism is perpendicular to the base and a rotation axis of the second rotary mechanism. The monitoring device can implement omnidirectional imaging while maintaining an overall appearance of the entire device.

19 Claims, 11 Drawing Sheets

# MONITORING DEVICE

RELATED APPLICATIONS

This application is a continuation application of Chinese application No. 202011090521.2, filed on Oct. 14, 2020, and the content of which is incorporated herein by reference in its entirety.

TECHNICAL FIELD

This disclosure relates to the field of smart homes, and in particular to a monitoring device.

BACKGROUND

With the development of smart home products, there is an increasing demand for multi-angle omnidirectional imaging in the field of home security. Therefore, a monitoring device that can perfectly perform omnidirectional imaging without compromising the overall appearance of the device is desired in the market.

SUMMARY

In view of the shortcomings of the existing technologies, according to one or more exemplary embodiments of this disclosure, a monitoring device is designed to perform imaging while maintaining the overall appearance of the device.

To solve the technical problem, according to one aspect of this disclosure, a monitoring device is provided, including: a base; a first rotary mechanism, connected to the base and rotatable relative to the base; a supporting bracket fixed to the first rotary mechanism; a second rotary mechanism, connected to the supporting bracket and rotatable relative to the supporting bracket; a lens assembly fixed to the second rotary mechanism; and a housing, fixed to the supporting bracket and including an opening to expose the lens assembly, wherein the first rotary mechanism, the supporting bracket, and the second rotary mechanism are arranged in the housing, and a rotation axis of the first rotary mechanism is perpendicular to the base and a rotation axis of the second rotary mechanism.

The monitoring device according to one or more exemplary embodiments of the present disclosure adopts a two-axis combined rotation structure, that is, vertical rotation in a window area and horizontal rotation of the entire device, to perform omnidirectional imaging without dead ends while maintaining the overall appearance of the device.

BRIEF DESCRIPTION OF THE DRAWINGS

Some exemplary embodiments of the present disclosure will be described in detail in the following accompanying drawings. Same drawing marks represent similar structures in various views in the drawings. Those of ordinary skill in the art will understand that these embodiments are non-restrictive and exemplary and that the drawings are for illustrative and descriptive purposes only and are not intended to limit the scope of this disclosure. Exemplary embodiments in other ways may similarly complete the inventive idea of this disclosure. It should be understood that the accompanying drawings are not drawn to scale.

DETAILED DESCRIPTION

The following description provides specific application scenarios and requirements of this disclosure, with the purpose of enabling those skilled in the art to make and use the content in this disclosure. For those skilled in the art, various modifications to the disclosed exemplary embodiments are obvious, and without departing from the scope of this disclosure, the general principles defined herein can be applied to other embodiments and applications. Therefore, the present disclosure is not limited to these exemplary embodiments, but is consistent with the broadest scope of the claims.

As shown in the figures, a monitoring device 100 may include a base 1, a supporting bracket 2, a bearing 3, a first rotary mechanism 4, a second rotary mechanism 5, a lens assembly 6, a housing 7 and a speaker 8.

The base 1 may be in a disc shape and may have an upper surface and a lower surface which are substantially flat. A bottom portion of the base 1 may be provided with a non-slip pad(s) 13 and a slot 14. The non-slip pad(s) 13 is configured to prevent the bottom portion of the base 1 from slipping relative to a surface in contact therewith. The slot 14 is configured to fixedly connect to a corresponding mount. In some exemplary embodiments, the base 1 may be provided with a lifting mechanism, which may be configured to raise the height of the base 1, such that the monitoring device 100 can monitor at a higher position. The base 1 may also be provided with a data line slot 11 and a reset button 12.

Figure 8:
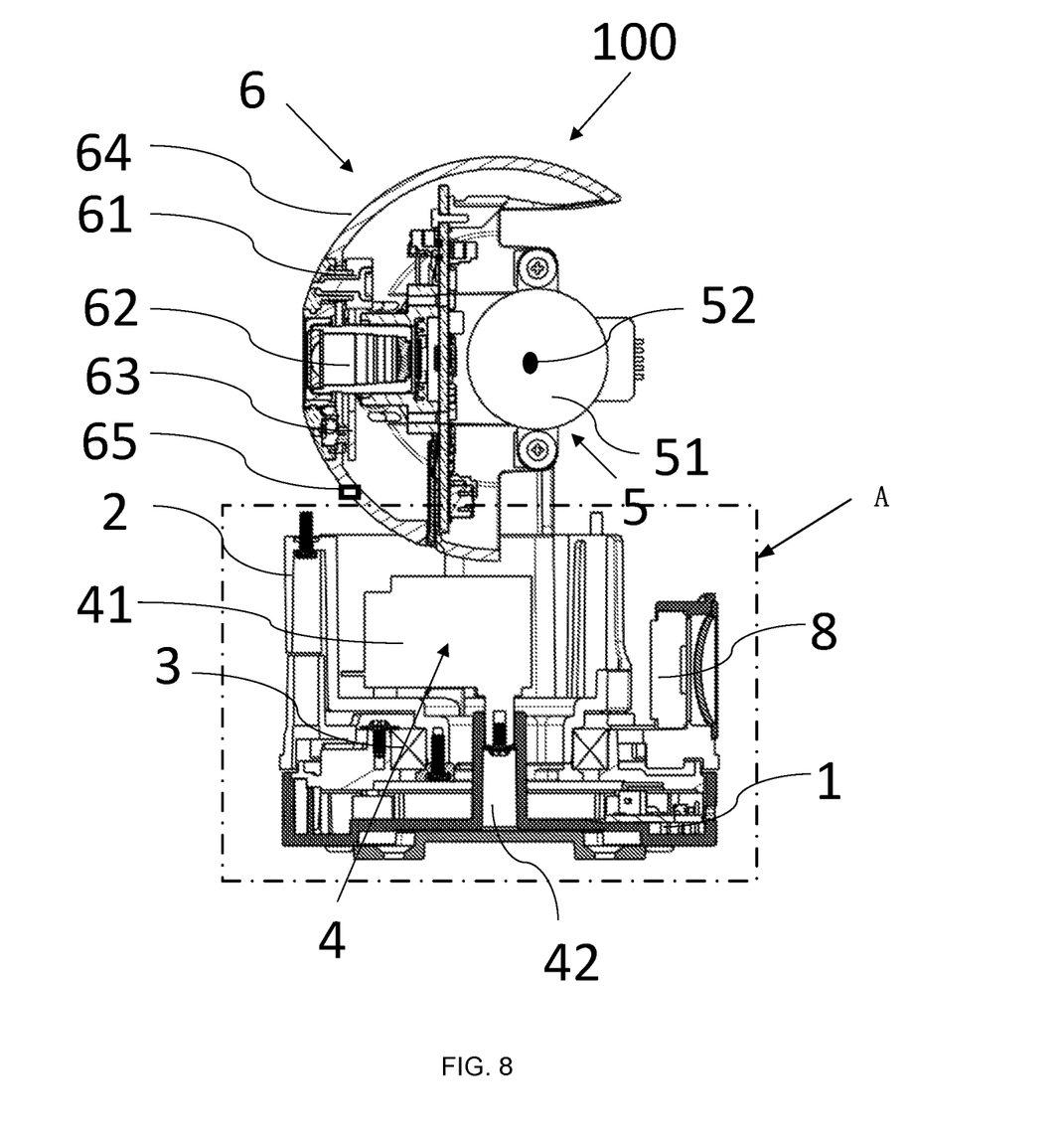
FIG. 8 is a side view of an internal structure of a monitoring device according to one or more exemplary embodiments of this disclosure.
Figure 10:
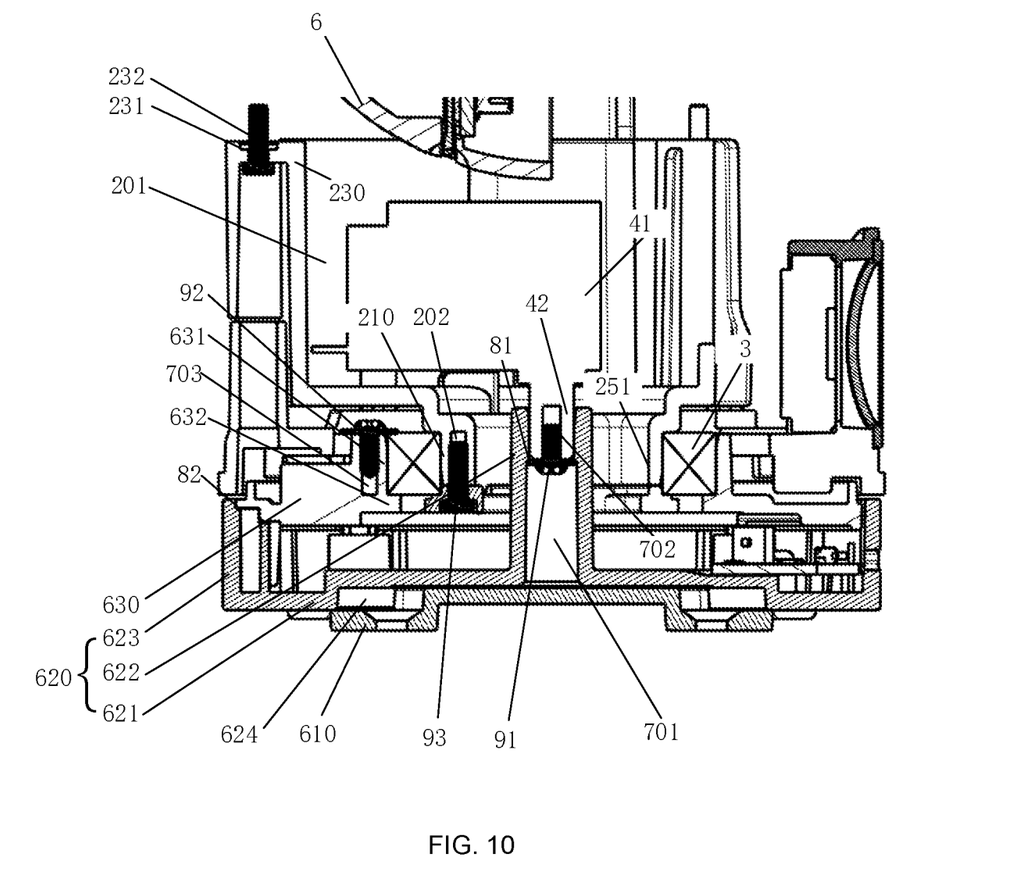
FIG. 10 is a detailed view of area A in FIG. 8.

As an example, FIG. 10 is a detailed view of area A in FIG. 8. Referring to FIG. 10, the base 1 may further include a supporting plate 610, a first rotary mechanism mounting seat 620 and a bearing mounting seat 630.

The supporting plate 610 may be located at the bottom portion of the monitoring device 100 and configured to support the monitoring device 100. The supporting plate 610 may be in a disc shape. An edge of the supporting plate 610 may be in contact with the ground or some other parts so as to reduce a contact area between the monitoring device and those parts. A middle part of the supporting plate 610 may protrude from the edge to support the entire monitoring device. The middle part of the supporting plate 610 may also seal a first rotary shaft mounting hole 701 to prevent dust from entering a cavity inside the supporting bracket 2 through the first rotary shaft mounting hole 701.

The first rotary mechanism mounting seat 620 is arranged on the supporting plate 610. The first rotary mechanism mounting seat 620 is rigidly connected to a first rotary shaft 42 to support the first rotary mechanism 4. Another end of the first rotary mechanism 620 is rigidly connected to the bearing mounting seat 630 to support the bearing mounting seat 630.

Referring to FIG. 10, the first rotary mechanism mounting seat 620 may include a supporting plate accommodation cavity 624. The supporting plate 610 may be at least partially inside the supporting plate accommodation cavity 624. The non-slip pad 13 and the slot 14 may be arranged on the first rotary mechanism mounting seat 620. An outer part of the first rotary mechanism mounting seat 620 is circular, and the size of the outer part is slightly smaller than that of the housing 7.

Specifically, the first rotary mechanism mounting seat 620 may include a support board 621, a first rotary shaft connection part 622 arranged in the middle of the support board 621, and a wall panel 623 surrounding an edge of the support board 621. The support board 621 may be in a disc shape. The first rotary shaft connection part 622 may be in a cylindrical shape. As an example, the first rotary shaft connection part 622 may be a hollow shaft protruding from the support board 621. The first rotary shaft connection part 622 may be provided with the first rotary shaft mounting hole 701, and the first rotary shaft 42 is arranged in the first rotary shaft mounting hole 701. As an example, the first rotary shaft mounting hole 701 may be a stepped hole. The first rotary shaft mounting hole 701 includes a first step face 81, and an end of the rotary shaft 42 is provided with a first threaded hole 702, where one end (screw rod end) of a first connector 91 is arranged in the first threaded hole 702, and the other end (head end) abuts against the first step face 81 and applies a first pressure to the first step face 81 to fasten the first rotary shaft 42 and the first rotary shaft connection part 622 together. The wall panel 623 surrounds an outer edge of the support board 621. The wall panel 623 and the first rotary shaft connection part 622 are located at a same side of the support board 621. The wall panel 623, the support board 621, and the first rotary shaft connection part 622 enclose an accommodation cavity. The accommodation cavity is configured to at least partially accommodate the bearing mounting seat 630, the bearing 3, and the supporting bracket 2. An end of the wall panel 623 is provided with a step face 82. The step face 82 supports an outer edge of the bearing mounting seat 630.

The bearing mounting seat 630 may be configured to support the bearing 3. One end of the bearing mounting seat 630 may be rigidly connected to the first rotary mechanism mounting seat 622, and the other end thereof is connected to the bearing 3. An edge of the bearing mounting seat 630 may be rigidly connected to the wall panel 623. A bearing mounting hole 631 may be arranged in the middle of the bearing mounting seat 630, and the bearing mounting hole 631 may be connected to an outer ring of the bearing 3. Referring to FIG. 10, the outer ring of the bearing 3 may be arranged in the bearing mounting hole 631, and the outer ring of the bearing 3 may be in an interference fit or transition fit with the bearing mounting hole 631. The bearing mounting seat 630 may further include a mounting edge 632, where the mounting edge 632 may serve for a positioning function. A first end of the outer ring of the bearing 3 abuts against the mounting edge 632, and the bearing mounting seat 630 is further provided with a threaded hole 703. The threaded hole 703 is arranged around a periphery of the bearing mounting hole 631. A fastener 92 is arranged in the threaded hole 703, where the diameter of the head of the fastener 92 is greater than the diameter of the outer ring of the bearing 3, thereby preventing the outer ring of the bearing from moving in an axial direction.

The supporting bracket 2 may be arranged above the base 1 and connected to the base 1 via the bearing 3. Referring to FIG. 10, the supporting bracket 2 is in a cylindrical shape. The supporting bracket 2 may include a cavity 201. The cavity 201 may be configured to at least partially accommodate the lens assembly 6 and the first rotary mechanism 4.

Figure 1:
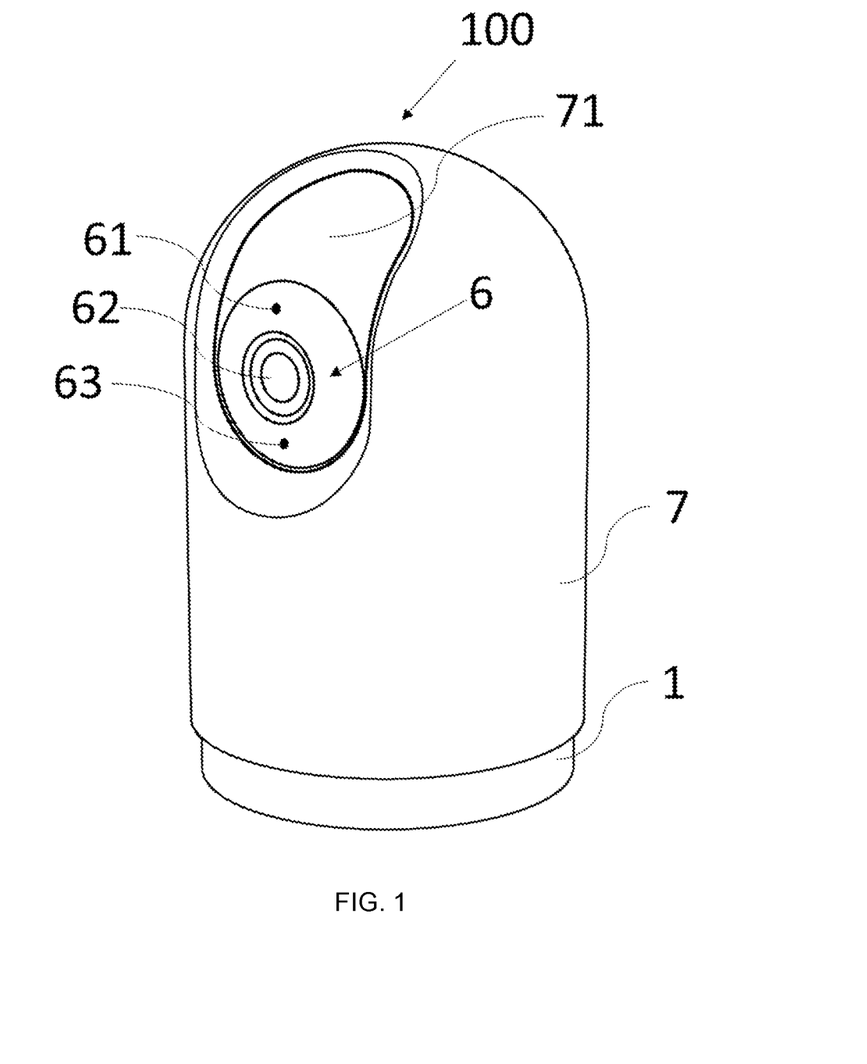
FIG. 1 is a perspective view of an external structure of a monitoring device according to one or more exemplary embodiments of this disclosure.
Figure 2:
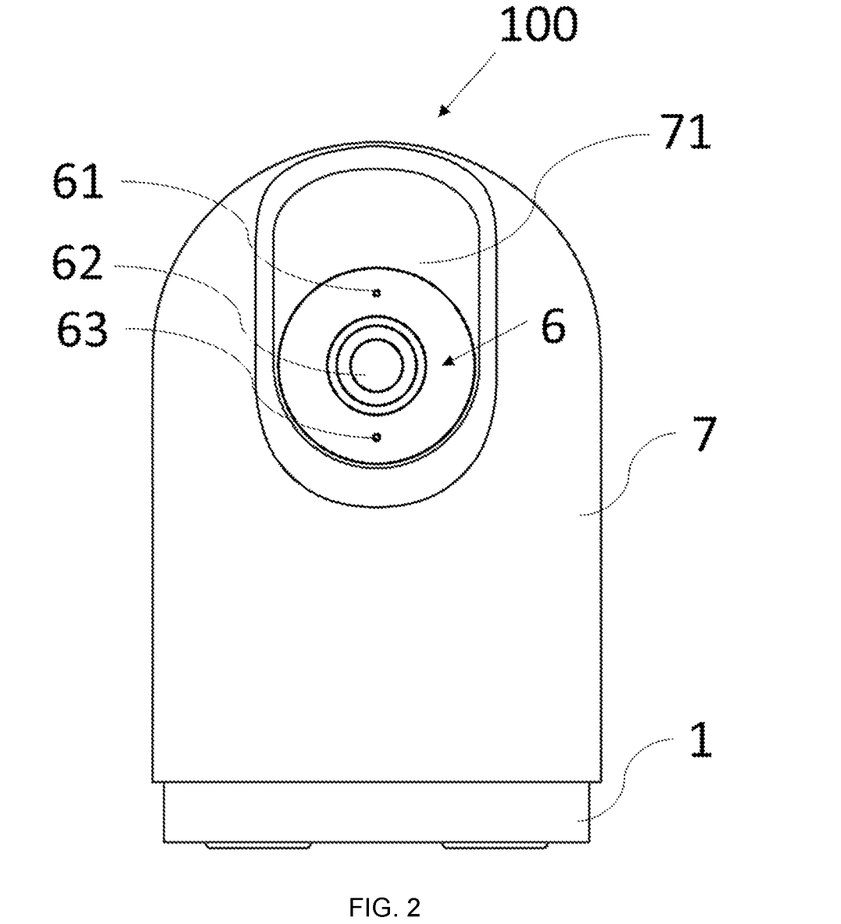
FIG. 2 is a front view of an external structure of a monitoring device according to one or more exemplary embodiments of this disclosure.
Figure 3:
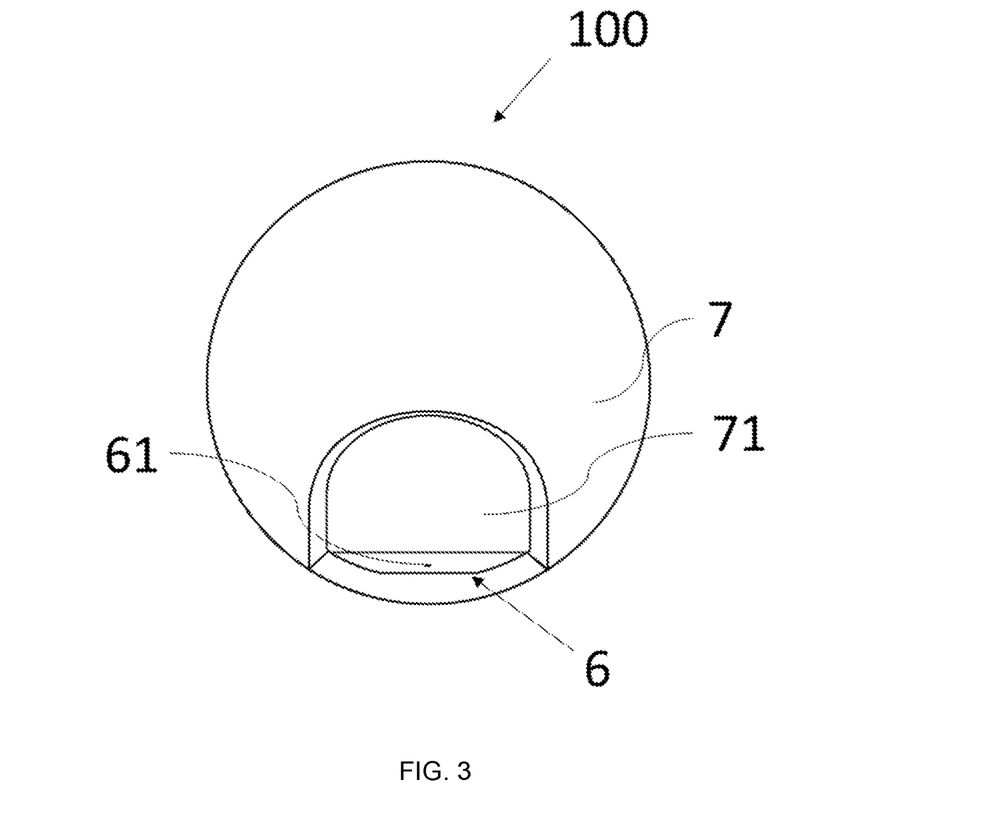
FIG. 3 is a top view of an external structure of a monitoring device according to one or more exemplary embodiments of this disclosure.
Figure 4:
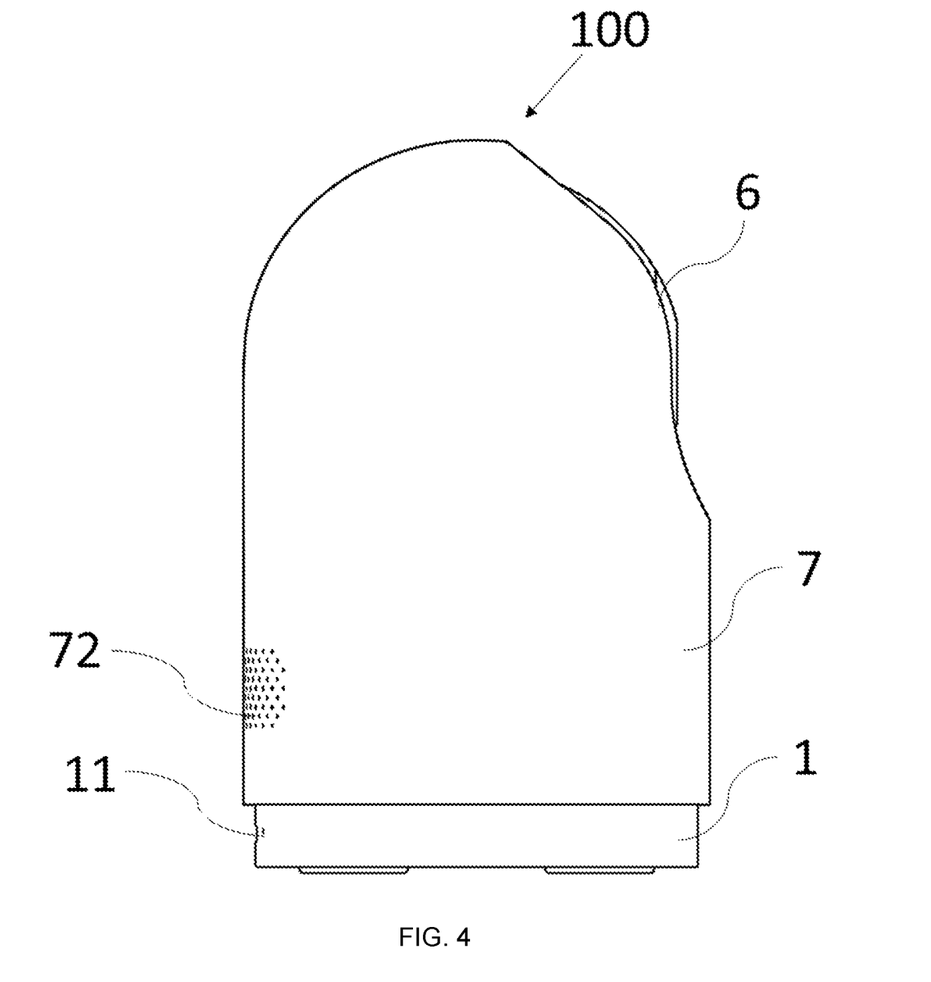
FIG. 4 is a side view of an external structure of a monitoring device according to one or more exemplary embodiments of this disclosure.
Figure 5:
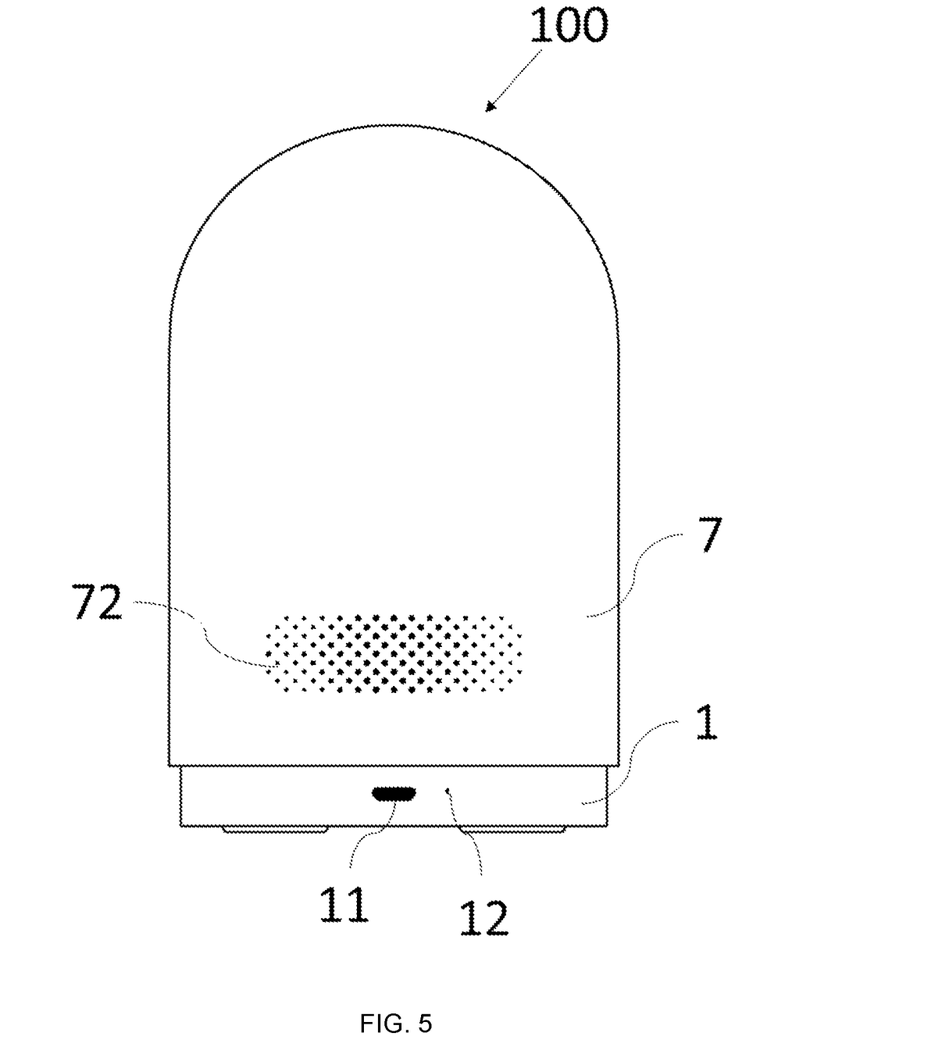
FIG. 5 is a rear view of an external structure of a monitoring device according to one or more exemplary embodiments of this disclosure.
Figure 6:
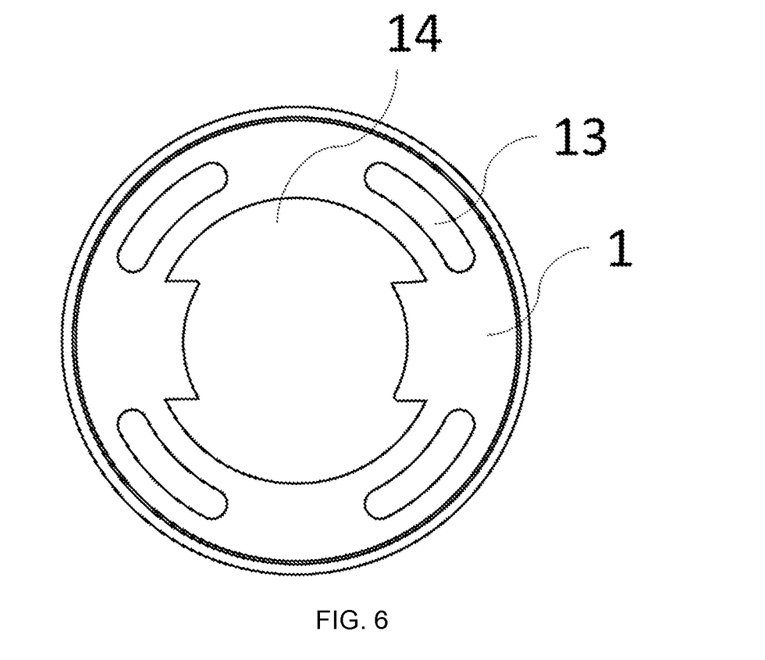
FIG. 6 is a bottom view of an external structure of a monitoring device according to one or more exemplary embodiments of this disclosure.
Figure 7:
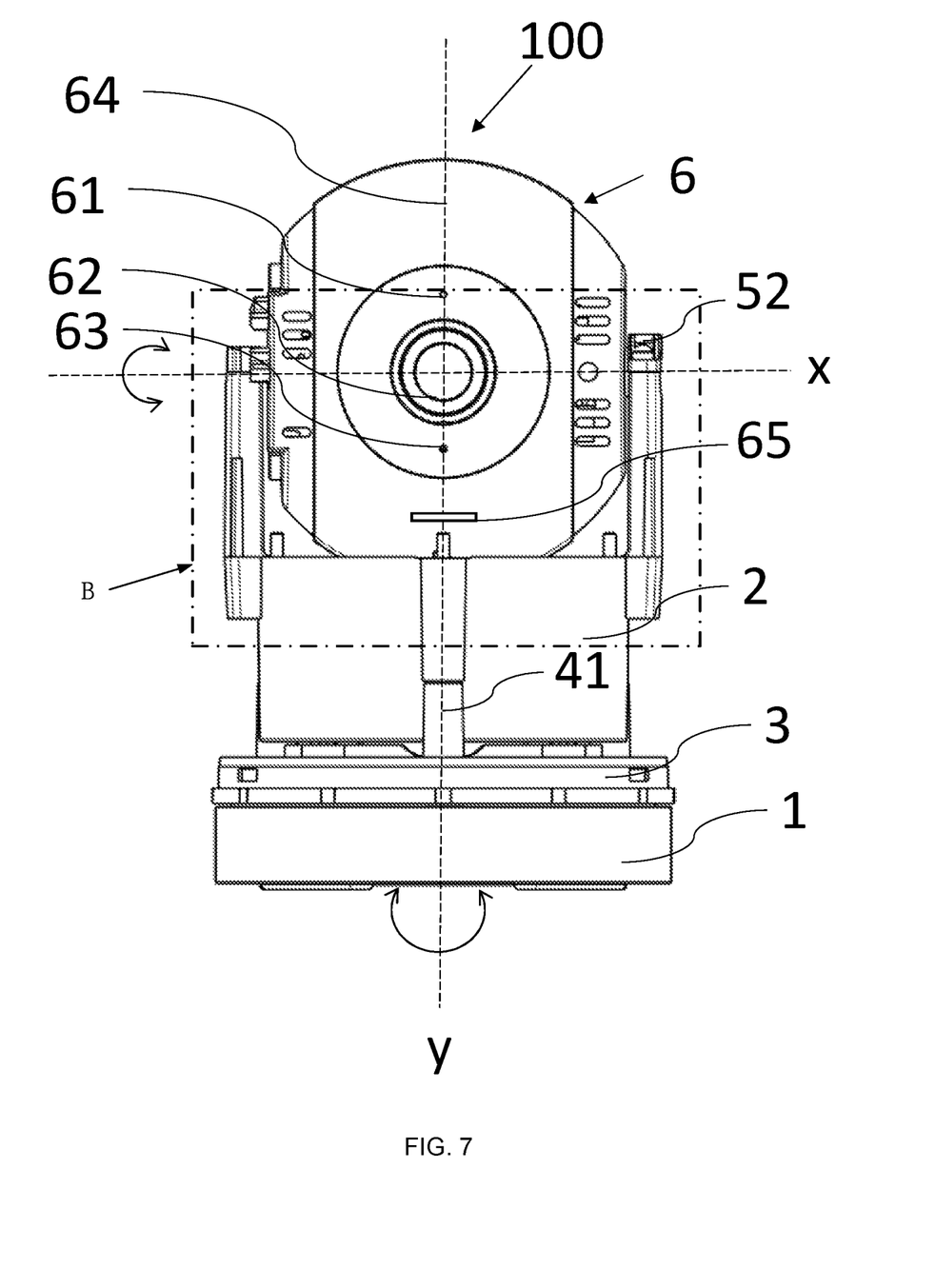
FIG. 7 is a front view of an internal structure of a monitoring device according to one or more exemplary embodiments of this disclosure.
Figure 11:
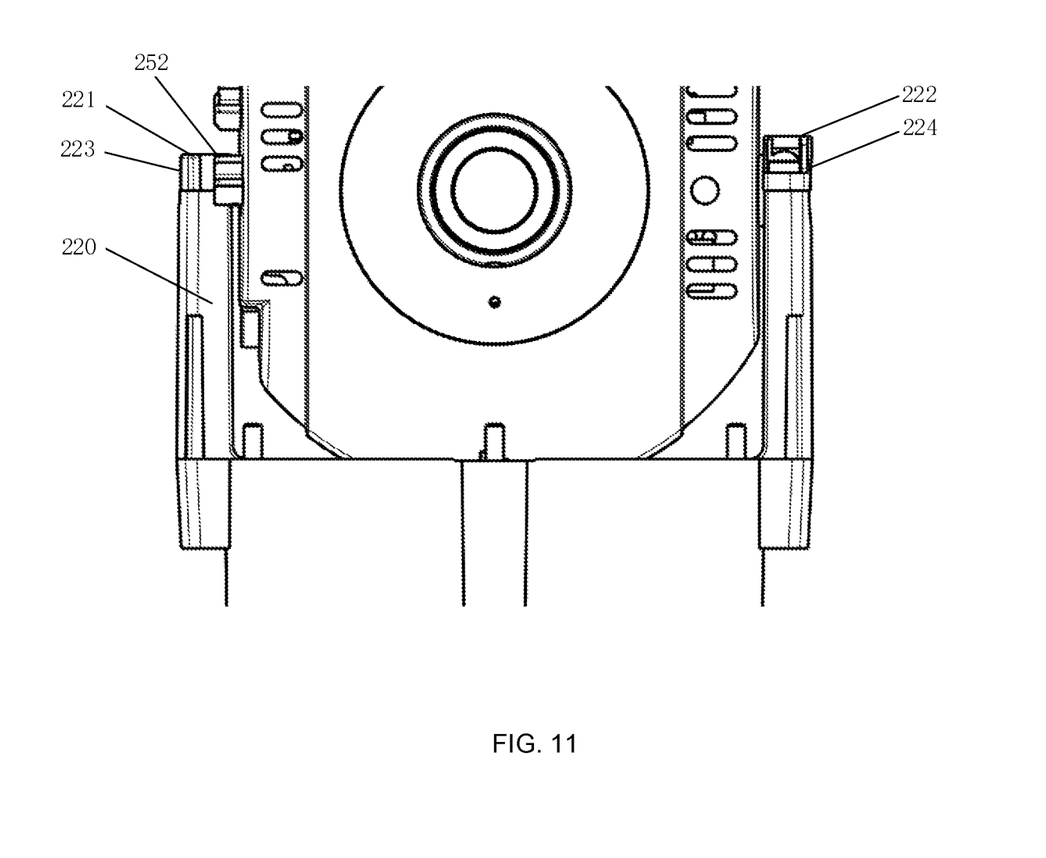
FIG. 11 is a detailed view of area B in FIG. 7.

As an example, FIG. 11 is a detailed view of area B in FIG. 7. Referring to FIG. 10 and FIG. 11, the supporting bracket 2 may include a first mounting portion 210, a second mounting portion 220 and a third mounting portion 230.

The first mounting portion 210 may be arranged at a first end of the supporting bracket 2. The first mounting portion 210 may be in a cylindrical shape. The first mounting portion 210 may be configured to be connected to an inner ring of the bearing 3. Referring to FIG. 10, the first mounting portion 210 may be arranged in the inner ring of the bearing 3. As an example, the first mounting portion 210 may be in an interference fit or transition fit with the bearing 3. An end of the first mounting portion 210 may be further provided with a second threaded hole 202, where one end (screw rod end) of a second connector 93 is arranged in the second threaded hole 202, and the other end (head end) abuts against the inner ring of the bearing 3 and applies a second pressure to the inner ring to fasten the inner ring of the bearing 3 and the first mounting portion 210 together.

Referring to 11, the second mounting portion 220 may be arranged at a second end of the supporting bracket 2 to support the lens assembly 6. As an example, the second mounting portion 220 may include a first supporting part 221 and a second supporting part 222 respectively arranged on two sides of the lens assembly 6. As an example, the first supporting part 221 and the second supporting part 222 may be rod-shaped structures extending from the first end to the second end of the supporting bracket, and the first supporting part 221 and the second supporting part 222 are at the periphery of the first mounting portion 210 to ensure that there is larger cavity space in the supporting bracket 2 for accommodating the lens assembly 6 while materials may be reduced. An end of a first supporting rod 221 may be provided with a first mounting hole 223. A first end of a rotary shaft of the lens assembly 6 may be arranged in the first mounting hole 223. A bearing may be arranged between the first end of the rotary shaft and the first mounting hole 223 to realize the rotation of the rotary shaft. An end of the second supporting rod 222 may be provided with a second mounting slot 224. A second end of a rotary shaft of the lens assembly 6 may be arranged in the first mounting hole 223.

Referring to FIG. 10, the third mounting portion 230 may be arranged between the first end and the second end of the supporting bracket 2. The third mounting portion 230 supports the housing 7 and is connected to the housing 7. The outer diameter of the third mounting portion 230 is shorter than the inner diameter of the housing 7. The third mounting portion 230 is inside the housing 7. The third mounting portion 230 may include a supporting face 231, and the supporting face 231 is configured to support the housing 7 so as to prevent the housing 7 from shifting in an axial direction. The third mounting portion 230 may further include a protrusion 232 protruding from the supporting face 231. The protrusion 232 may be configured to be connected to the hole 702 in the housing 7 to prevent the housing 7 from shifting in a circumferential direction relative to the supporting bracket 2 when the supporting bracket 2 rotates. As an example, the protrusion 232 may be a positioning rod protruding from the supporting face 231, and the hole 702 may be a positioning hole in the housing 7. The positioning rod may enter the positioning hole inside the housing 7 to for positioning the housing 7. When the supporting bracket 2 rotates, the positioning rod may drive the housing 7 to rotate with the supporting bracket 2, thereby ensuring the normal operation of the monitoring device 100. In some exemplary embodiments, the inner diameter of the hole 702 may be greater than the outer diameter of the protrusion 232, and a user may take out the housing 7 from the supporting bracket 2 with a relatively small force, which is convenient for installation and removal. In some exemplary embodiments, the protrusion 232 may also be a screw rod installed on the third mounting portion 230 and protruding from the supporting face 231.

According to the foregoing description, the supporting bracket 2 includes the cavity 201. The cavity 201 may include a first opening 251 and a second opening 252. The first opening 251 corresponds to the first mounting portion 210, and the second opening 252 corresponds to the second mounting portion 220. The first opening 251 may be arranged at an end of the first mounting portion 210. The first opening 251 may be configured to allow the first rotary shaft connection part 622 to pass therethrough to be connected to the first rotary shaft 42. The second opening 252 may be arranged at an end of the second mounting portion 220. The second opening 252 may have an open structure to facilitate the installation of the lens assembly 6 on the second mounting portion 220.

The bearing 3 may be arranged between the base 1 and the supporting bracket 2. The bearing 3 may be used to support the supporting bracket 2 and enable the supporting bracket 2 to rotate relative to the base 1. The bearing 3 may rotate relative to the base 1 and the supporting bracket 2.

The first rotary mechanism 4 may be connected to the base 1 and rotate relative to the base 1. The first rotary mechanism 4 may include a first stepping motor, where the first stepping motor may include a first body 41 and the first rotary shaft 42. The first body 41 may be fixed to the supporting bracket 2. The first body 41 may be rigidly connected to the supporting bracket 4. For example, the fastener may be used to fasten the first body 41 with an inner wall of the supporting bracket 4. The first rotary shaft 42 may be fixed to the base 1. The first body 41 may rotate relative to the first rotary shaft 42 (for example, an axis y). When the first body 41 rotates relative to the first rotary shaft 42, the supporting bracket 2 may, with the first body 41, rotate relative to the first rotary shaft 42, thereby rotating relative to the base 1.

The second rotary mechanism 5 may be connected to the supporting bracket 2 and rotate relative to the supporting bracket 2. The second rotary mechanism 5 may include a second stepping motor, where the second stepping motor may include a second body 51 and a second rotary shaft 52. The second body 51 may be fixed to the lens assembly 6. The second rotary shaft 52 may be fixed to the supporting bracket 2. The second body 51 may rotate relative to the second rotary shaft 52 between a first position and a second position (for example, rotate around an axis x). In the first position, the lens assembly 6 faces forward, and in the second position, the lens assembly 6 faces upward. A rotation axis of the first rotary mechanism 4 may be perpendicular to the base 1, and also perpendicular to a rotation axis of the second rotary mechanism 5. In other words, the first rotary shaft 42 may be perpendicular to the base 1 and the second rotary shaft 52. When the second body 51 rotates relative to the second rotary shaft 52, the lens assembly 6 may rotate, with the second body 51, relative to the second rotary shaft 52, thereby rotating relative to the supporting bracket 2 and the housing 7.

The lens assembly 6 may be fixed to the second rotary mechanism 5, and specifically to the second body 51. The lens assembly 6 may include a lens 61, an indicator 62, a microphone 63, a frame 64, and a memory card slot 65. In some exemplary embodiments, the lens assembly 6 may further include a flash lamp or a lighting lamp group. The lens 61 may include an optical lens and an image sensor, where the optical lens may be used to converge light to the image sensor, and the image sensor may be used to generate image data based on an electrical signal. The indicator 62 may be an LED light, which is used to indicate a working status (for example, failure, normal, communicating, and the like.) of the monitoring device 100. The microphone 63 is used to collect an external sound signal. The frame 64 may be connected to the second rotary mechanism 5, and specifically fixed to the second body 51. The memory card slot 65 is used to receive a memory card. The lens 61, the indicator 62, the microphone 63 and the memory card slot 65 are all connected to the frame 64. The distance between the lens 61 and the second rotary shaft 52 may be approximately equal to half of the inner diameter of the housing 7.

The housing 7 may be fixed to the supporting bracket 2. When the first body 41 rotates relative to the first rotary shaft 42, the housing 7 rotates, with the first body 41, relative to the first rotary shaft 42, thereby rotating relative to the base 1. The housing 7 may include a top portion and a main body, where the top portion may be in an approximately hemispherical shape and the main body is approximately cylindrical. The top portion of the housing 7 may include an opening 71, where the opening 71 may extend radially relative to the second rotary shaft 52 from the top portion of the housing 7 toward the middle of the housing 7. A radially extending angle between the opening 71 and the second rotary shaft 52 may be 85 degrees to 110 degrees. In some exemplary embodiments, the radially extending angle between the opening 71 and the second rotary shaft 52 may be 180 degrees. When the second body 51 rotates relative to the second rotary shaft 52 to the first position, the opening 71 does not expose the memory card slot 65, and when the second body 51 rotates relative to the second rotary shaft 52 to the second position, the opening 71 exposes the memory card slot. The housing 7 may cover a part of the base 1. In some exemplary embodiments, the housing 7 may cover an entire side of the base 1.

The speaker 8 may be used to send out an audio signal.

In some exemplary embodiments, the monitoring device 100 may further include a mainboard, a controller, a bus, an energy storage device, a communication device, and the like. The mainboard may be fixed to the supporting bracket 2. The controller, the bus, the energy storage device, and the communication device may be fixed to the mainboard. The bus may be configured to electrically connect various electronic components of the monitoring device 100, such as the image sensor, the controller, the energy storage device, the communication device, the microphone, the speaker, the first stepping motor, the second stepping motor, and the like. The controller may be used to control various electronic components of the monitoring device 100. The energy storage device may be configured to store electric energy for various electronic components of the monitoring device 100. The communication device may be configured to communicate with a mobile terminal to receive an instruction from the mobile terminal or to send data to the mobile terminal.

Figure 9:
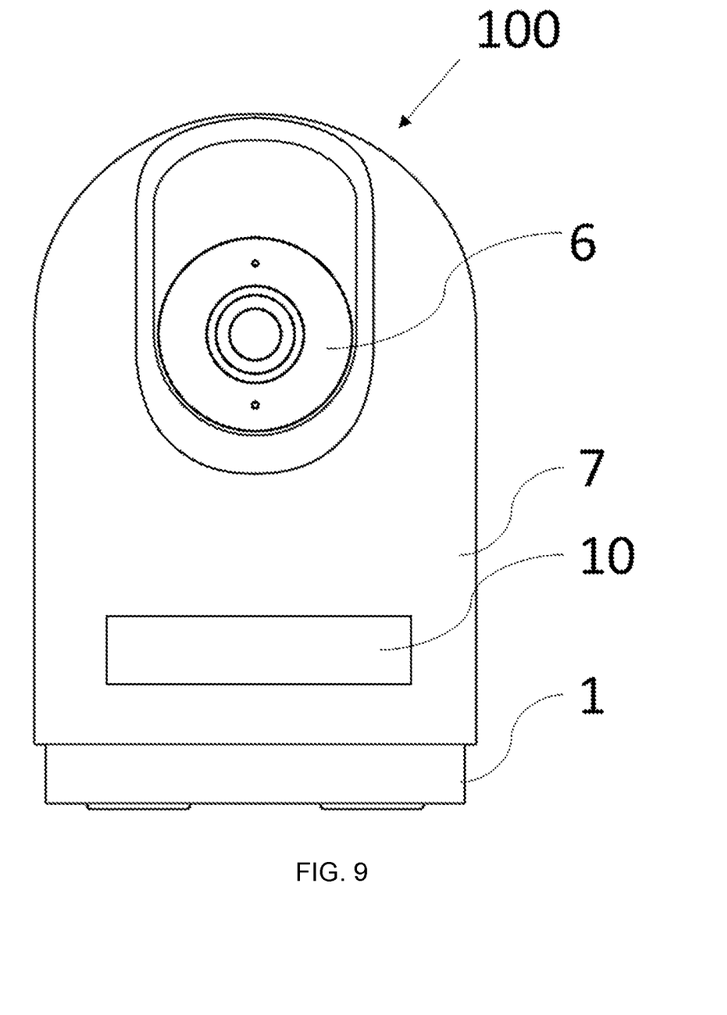
FIG. 9 is a front view of an external structure of a monitoring device according to one or more exemplary embodiments of this disclosure.

FIG. 9 shows some exemplary embodiments of a monitoring device. These exemplary embodiments shown in FIG. 9 are similar to those exemplary embodiments shown in FIG. 1 to FIG. 8, so similar or identical components will not be described herein again. The difference between the exemplary embodiments shown in FIG. 9 and those shown in FIG. 1 to FIG. 8 is that those shown in FIG. 9 have a display 10, where the display 10 is arranged on the housing 1. The display 10 may be an LED display screen or a liquid crystal display. The display 10 may be used to display alarm information, prompt information, time, and the like.

In summary, after reading this detailed disclosure, those skilled in the art can understand that the foregoing detailed disclosure is exemplary, non-limiting description. Those skilled in the art can understand that this disclosure intends to cover various changes, improvements and modifications of the exemplary embodiments. These changes, improvements and modifications are intended to be proposed in this disclosure and are within the scope of the exemplary embodiments of this disclosure.

What is claimed is:

1. A monitoring device, comprising:
  a base;
  a first rotary mechanism connected to the base and rotatable relative to the base, including:
    a first stepping motor including:
      a first body, and
      a first rotary shaft;
  a supporting bracket fixed to the first rotary mechanism;
  a second rotary mechanism, connected to the supporting bracket and rotatable relative to the supporting bracket;
  a lens assembly fixed to the second rotary mechanism;
  a housing, fixed to the supporting bracket and including an opening to expose the lens assembly; and
  a bearing, arranged between the supporting bracket and the base to support the supporting bracket, wherein
    the first rotary mechanism, the supporting bracket, and the second rotary mechanism are arranged in the housing,
    a rotation axis of the first rotary mechanism is perpendicular to the base and a rotation axis of the second rotary mechanism, and
    the bearing is rotatable relative to the supporting bracket and the base, and the first rotary shaft passes through the bearing.

2. The monitoring device according to claim 1, wherein the first body is fixed to the supporting bracket;
  the first rotary shaft is fixed to the base; and
  the first body is rotatable relative to the first rotary shaft.

3. The monitoring device according to claim 1, wherein the base includes:
  a supporting plate, arranged at a bottom portion of the monitoring device to support the monitoring device;
  a first rotary mechanism mounting seat, arranged on the supporting plate and rigidly connected to the first rotary shaft to support the first rotary mechanism; and
  a bearing mounting seat, wherein one end of the bearing mounting seat is rigidly connected to the first rotary mechanism mounting seat, and another end of the bearing mounting seat is connected to the bearing to support the bearing.

4. The monitoring device according to claim 3, wherein the first rotary mechanism mounting seat includes a support board, a first rotary shaft connection part arranged in a middle portion of the support board, and a wall panel surrounding an edge of the support board, wherein
  the first rotary shaft connection part is cylindrical and includes a first rotary shaft mounting hole, and the first rotary shaft is arranged in the first rotary shaft mounting hole.

5. The monitoring device according to claim 4, wherein
  the first rotary shaft mounting hole includes a first step face;
  an end of the first rotary shaft includes a first threaded hole;
  one end of a first connector is arranged in the first threaded hole; and
  another end of the first connector abuts against the first step face and applies a first pressure to the first step face to fasten the first rotary shaft with the first rotary shaft connection part.

6. The monitoring device according to claim 3, wherein
  an edge of the bearing mounting seat is rigidly connected to the wall panel;
  a bearing mounting hole is arranged in a middle portion of the bearing mounting; and
  the bearing mounting hole is connected to an outer ring of the bearing.

7. The monitoring device according to claim 1, wherein the supporting bracket includes:
  a first mounting portion, arranged at a first end of the supporting bracket, wherein the first mounting portion is cylindrical and is connectable to an inner ring of the bearing;
  a second mounting portion, arranged at a second end of the supporting bracket to support the lens assembly; and
  a third mounting portion, arranged between the first end and the second end of the supporting bracket, wherein the third mounting portion is connected to the housing to support the housing.

8. The monitoring device according to claim 7, wherein the supporting bracket includes a cavity configured to at least partially accommodate the lens assembly and the first rotary mechanism.

9. The monitoring device according to claim 8, wherein the cavity includes a first opening arranged at an end of the first mounting portion to allow a first rotary shaft connection part to pass through the first opening so as to connect to the first rotary shaft.

10. The monitoring device according to claim 8, wherein
  an end of the first mounting portion includes a second threaded hole;
  one end of a second connector is arranged in the second threaded hole; and
  another end of the second connector abuts against the inner ring of the bearing and applies a second pressure to the inner ring to fasten the inner ring of the bearing with the first mounting portion.

11. The monitoring device according to claim 7, wherein the third mounting portion includes a supporting face to support the housing so as to prevent the housing from shifting in an axial direction.

12. The monitoring device according to claim 8, wherein the third mounting portion further includes a protrusion protruding from the supporting to connect to a hole in the housing, so as to prevent the housing from shifting in a circumferential direction relative to the supporting bracket when the supporting bracket rotates.

13. The monitoring device according to claim 1, wherein
the second rotary mechanism includes a second stepping motor;
the second stepping motor includes a second body and a second rotary shaft;
the second body is fixed to the lens assembly;
the second rotary shaft is fixed to the supporting bracket; and
the second body is rotatable relative to the second rotary shaft between a first position and a second position.

14. The monitoring device according to claim 13, wherein
the lens assembly includes a frame and a lens;
the frame is fixed to the second body; and
the lens is fixed to the frame and spaced apart from the second body.

15. The monitoring device according to claim 14, further comprising:
a display, arranged in the housing.

16. The monitoring device according to claim 15, wherein the opening extends radially relative to the second rotary shaft from a top portion of the housing to a middle portion of the housing.

17. The monitoring device according to claim 16, wherein a radially extending angle between the opening and the second rotary shaft is 85 degrees to 110 degrees.

18. The monitoring device according to claim 17, wherein the lens assembly further includes a memory card slot arranged in the frame to receive a memory card.

19. The monitoring device according to claim 18, wherein a size of the opening is configured that:
the opening does not expose the memory card slot when the second body rotates relative to the second rotary shaft to the first position, and
the opening exposes the memory card slot when the second body rotates relative to the second rotary shaft to the second position.

\* \* \* \* \*

UNITED STATES PATENT AND TRADEMARK OFFICE
CERTIFICATE OF CORRECTION

PATENT NO. : 11,252,309 B1
APPLICATION NO. : 17/371075
DATED : February 15, 2022
INVENTOR(S) : Jian Zhang It is certified that error appears in the above-identified patent and that said Letters Patent is hereby corrected as shown below:

In the Specification

On Column 1, Line 6, after "application No. 202011090521.2, filed on", please delete "Oct. 14, 2020" and substitute therefor ---Oct. 13, 2020---

Signed and Sealed this
Nineteenth Day of April, 2022

Katherine Kelly Vidal
*Director of the United States Patent and Trademark Office*